United States Patent [19]

Sutowski

[11] 4,073,551
[45] Feb. 14, 1978

[54] ROLLING TYPE BEARING AND METHOD FOR MAKING SAME

[75] Inventor: Walter S. Sutowski, Brecksville, Ohio

[73] Assignee: Freeway Corporation, Cleveland, Ohio

[21] Appl. No.: 703,627

[22] Filed: July 8, 1976

[51] Int. Cl.² ............................................. F16C 33/60
[52] U.S. Cl. ................................... 308/195; 308/213
[58] Field of Search ................... 308/188, 189 R, 202, 308/207 R, 195

[56] References Cited

U.S. PATENT DOCUMENTS

| | | | |
|---|---|---|---|
| 2,623,245 | 12/1952 | Pierce et al. | 308/195 X |
| 3,013,327 | 12/1961 | Spence | 308/195 |

Primary Examiner—Joseph F. Peters, Jr.
Assistant Examiner—Gene A. Church
Attorney, Agent, or Firm—Fay & Sharpe

[57] ABSTRACT

A ball bearing and method for making same in which at least one of the inner and outer bearing races is comprised of sheet metal and formed to include at least one circumferentially disposed ball member receiving groove therein. The sheet metal race is formed by a plurality of separate steps which may be conveniently sequentially performed in a single progressive type die. In forming the sheet metal race, a generally flat bearing race blank is formed into a cylindrical configuration with the opposite ends thereof brought into a close spaced relationship with each other so as to form a slot-like opening therebetween. During the final stages of such forming, a squeezing or working force is applied circumferentially to the race in order to place the race into the plastic range to thereby eliminate undesired spring back or separation between the closely spaced ends.

23 Claims, 12 Drawing Figures

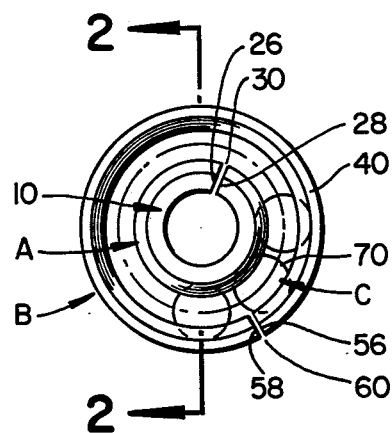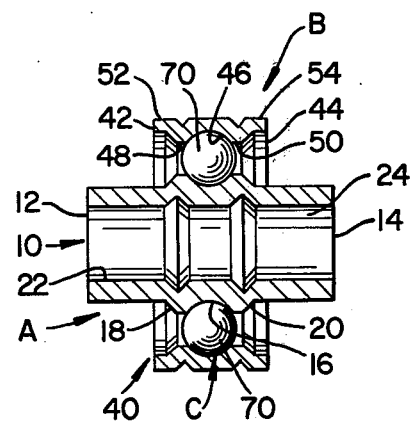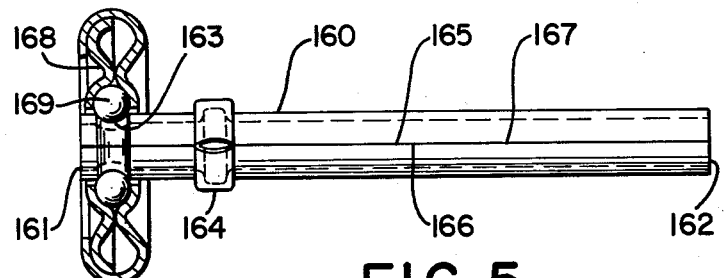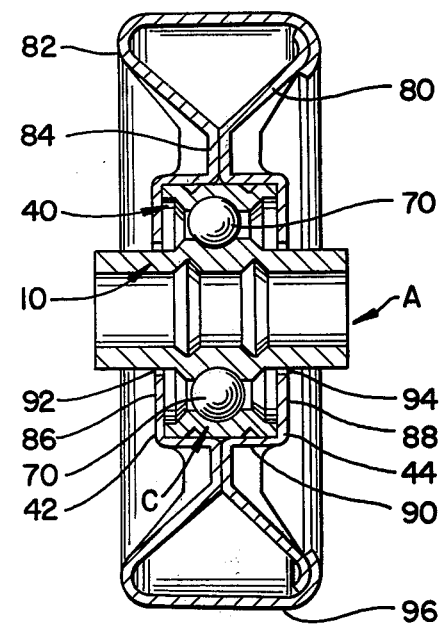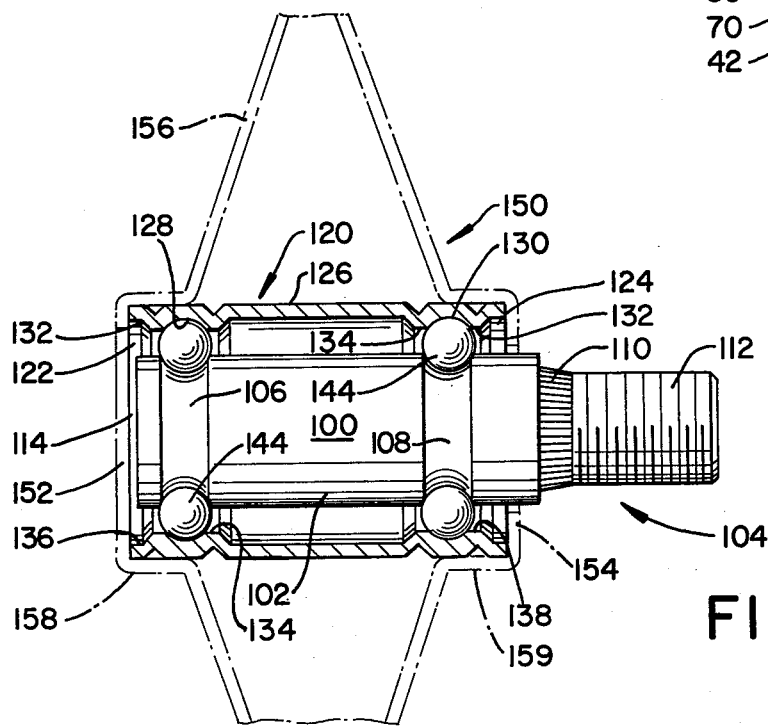

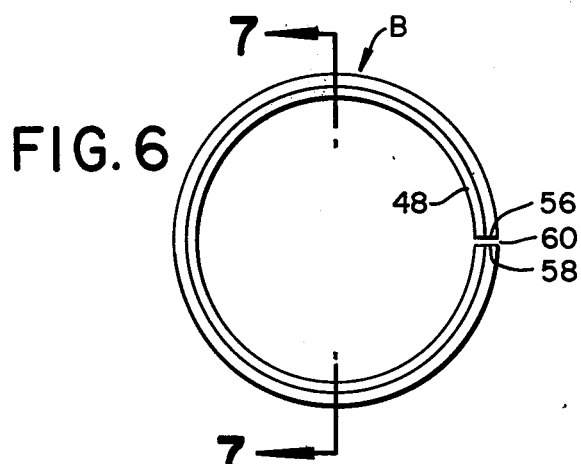
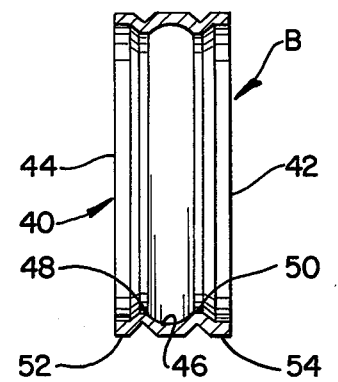
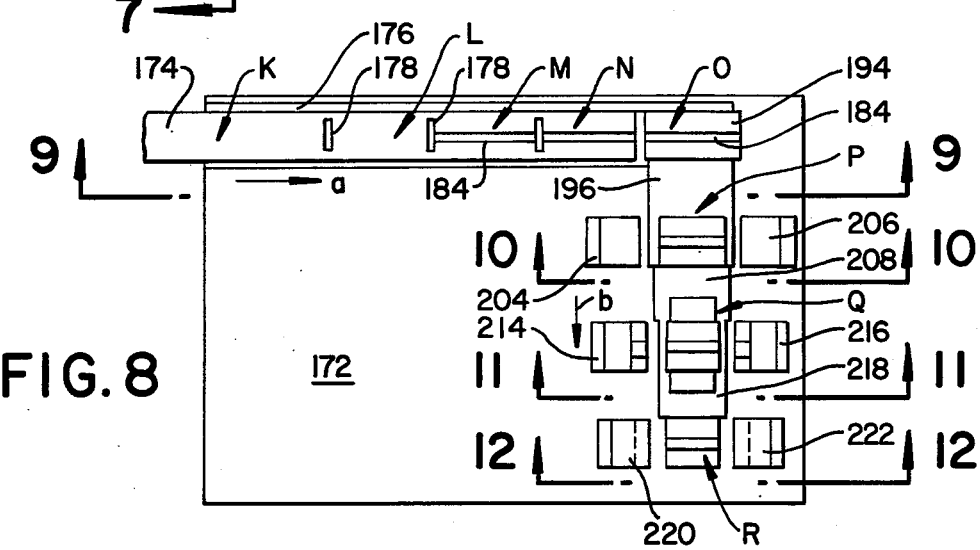
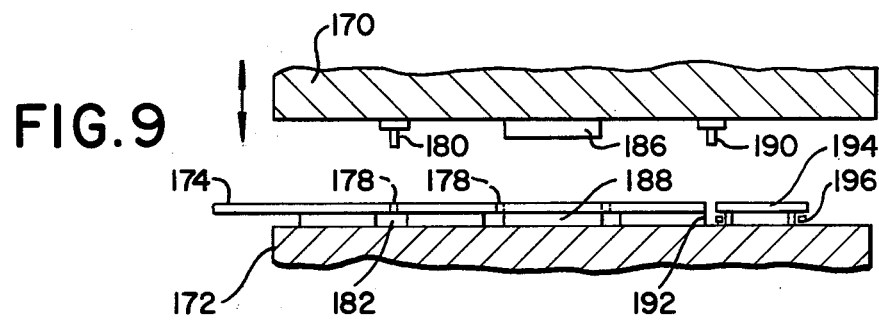
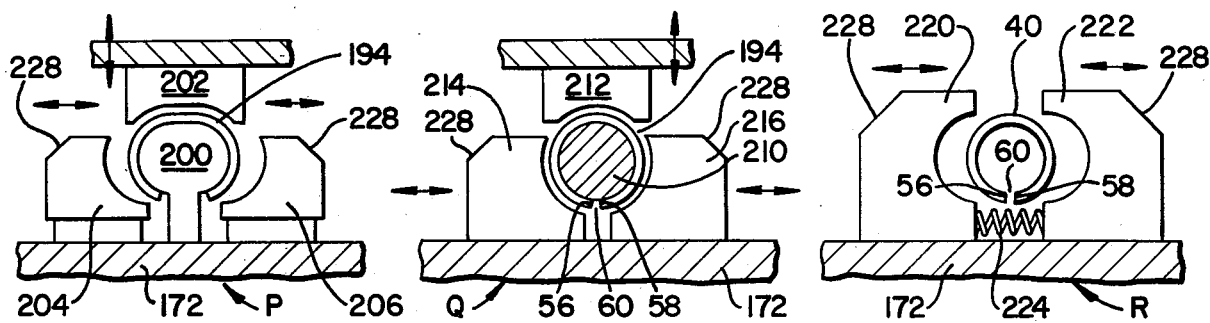

ROLLING TYPE BEARING AND METHOD FOR MAKING SAME

BACKGROUND OF THE INVENTION

This invention pertains to the art of bearings and more particularly to rolling type bearings.

The invention is particularly applicable to ball bearings of the semi-precision type in which at least one of the bearing races is formed from sheet metal and will be described with particular reference thereto; however, it will be appreciated by those skilled in the art that the invention has broader applications and may be advantageously employed in other environments and applications.

Semi-precision bearings of the type to which the present invention is directed have been heretofore known in the art. This type of bearing is typically employed in situations where extremely close tolerances for the bearings are not necessary or required as in, for example, toys, wheels, roller skates, some light non-precision machinery, conveyors, overhead doors and the like. One advantage for using such bearings is that they may be manufactured less expensively and in greater volume, thus reducing the overall cost of those articles on which they are employed.

Those bearings of the general type to which the subject invention is directed include coaxial inner and outer races with balls or rolling members disposed therebetween to permit ease of relative rotation between the races. The structures of the prior art semi-precision ball bearings have employed several materials for forming the races themselves including wire, bar stock and sheet metal. With regard to races formed from wire and bar stock, the forming processes have required several independent manufacturing steps. Each of these steps adds undesired costs to the final bearing structures because of the necessary labor and equipment expenditures. Moreover, the prior bearing races have comprised closed loop configurations in order to prevent any undesired separation or expansion of the races. These closed loops render it extremely difficult to assemble the overall ball bearing structure.

Prior bearing races constructed of sheet metal have taken many forms and also require that they be formed in a closed loop configuration. This configuration is necessary because of the physical property of spring back associated with the forming and working of sheet metal. Heretofore, final forming of the sheet metal races has only been through the elastic range so that there is a tendency for the races to spring back or expand somewhat from their final formed configuration. To eliminate these spring back or expansion problems, the ends of the sheet metal blanks which are formed into the races are rigidly affixed to each other as by welding or the like. The necessity for such joining adds additional costs to the overall bearing constructions and, again, makes assembly of the bearings more difficult.

The present invention contemplates a new and improved article and method which overcomes all of the above referred to problems and others and provides a ball or rolling bearing and method for making same which are simple, economical, dimensionally precise, permit easy fabrication of the bearing races, readily adapted for use with a plurality of bearing designs and readily adapted for use in a plurality of environments utilizing semi-precision bearings.

BRIEF DESCRIPTION OF THE INVENTION

In accordance with the present invention, there is provided a bearing structure including, in combination, coaxial inner and outer cylindrical races having a plurality of ball or rolling members disposed therebetween. At least one of the races is constructed from a blank or strip of fairly rigid formable material having spaced apart ends and which blank is formed into a substantially cylindrical configuration with the ends brought in a close spaced relationship with each other. These ends thus define a slot-like area which allows the ends to be selectively moved toward and away from each other. During forming, the blank is squeezed or worked into the plastic range so as to eliminate any spring back tendencies which would otherwise be present. The at least one race is also formed to include a circumferential ball or rolling member receiving groove integral therewith opening toward the other race. The other race also includes a circumferential roller member receiving groove with the ball members themselves receiving in and between the grooves to facilitate relative rotation between the races. The slot-like area in the at least one race permits temporary deformation of the race to accommodate forced insertion of the ball bearing members between the races and into the receiving grooves.

In accordance with another aspect of the present invention, the inner race comprises an elongated member defining a mounting shaft having at least one outwardly opening receiving groove formed therein.

In accordance with another aspect of the present invention, the inner race includes a pair of spaced apart outwardly opening ball or rolling member receiving grooves and the outer race is formed to include a pair of spaced apart inwardly opening ball or rolling member receiving grooves.

In accordance with still another aspect of the present invention, both the inner and outer races are constructed from blanks or strips of fairly rigid formable material each having spaced apart ends and which blanks are formed into substantially cylindrical configurations with the ends brought into a close spaced relationship with each other in order that each race has a slot-like area therein. Also, both races are squeezed or worked into the plastic range during final forming thereof.

In accordance with still a further aspect of the present invention, there is provided a method for forming a ball or rolling bearing race. This method comprises the steps of:

(a) advancing longitudinally and along a predetermined work path, a strip of fairly rigid formable material having a predetermined width required for the finished race width and an indeterminate length;

(b) cutting transverse slots into the strip partially across the width thereof at periodic intervals therealong with these intervals being substantially equal to the final desired circumference of the race and defining a bearing race blank therebetween;

(c) forming at least one rolling member receiving groove longitudinally along the strip between two adjacent slots in the strip;

(d) severing the blank from the strip;

(e) curling the longitudinal ends of the blank such that the ends accurately conform to the final desired radius of the race;

(f) engaging the blank with forming means to cause the blank to be completely formed with the opposed ends of the blank brought into a close spaced relationship with each other to form a race;

(g) applying a squeezing force to the race which is sufficient to place the material thereof into the plastic range to thereby eliminate spring back between the close spaced ends.

In accordance with still a further aspect of the invention, the method steps of advancing, cutting, forming, severing, curling, engaging and applying are performed at consecutive work stations in a single die.

One advantage to the present invention is the provision of a rolling bearing and method for making same which are simple in design and permit ease of manufacture.

Another advantage to the present invention is the provision of a rolling bearing and method for making the same which utilize a conventional sheet metal stock for at least one of the inner and outer bearing races.

Still a further advantage of the present invention is the provision of a rolling bearing and method for making same which facilitate ease of assembly for the overall bearing structure.

Still another advantage to the present invention is the provision of a rolling bearing and method for making same which are readily adapted to use in a plurality of different applications and environments.

BRIEF DESCRIPTION OF THE FIGURES

The invention may take physical form in certain parts and arrangements of parts, preferred embodiments of which will be described in detail in this specification and illustrated in the accompanying drawings which form a part hereof and wherein:

FIG. 1 is a side view of a semi-precision rolling or ball bearing incorporating the concepts of the subject invention;

FIG. 2 is a cross-sectional view taken along lines 2—2 of FIG. 1;

FIG. 3 is a cross-sectional view similar to FIG. 2 showing use of the bearing of FIGS. 1 and 2 in a typical application;

FIG. 4 is a cross-sectional view similar to that of FIG. 3 showing an alternative bearing structure incorporating the concepts of the subject invention;

FIG. 5 is a side view in partial cross-section showing stil another arrangement incorporating the concepts of the subject invention;

FIG. 6 is a side view of an outer ball bearing race formed in accordance with the concepts of the subject invention;

FIG. 7 is a cross-sectional view taken along lines 7—7 of FIG. 6; and,

FIGS. 8-12 are generally schematic views showing the method of constructing the outer bearing race of FIGS. 6 and 7.

DETAILED DESCRIPTION OF THE INVENTION

Referring now to the drawings wherein the showings are for purposes of illustrating preferred embodiments of the invention only and not for purposes of limiting same, the FIGURES show a ball or roller bearing structure comprised of an inner race A, an outer race B and a plurality of ball or rolling members C disposed between and in contact with the outer surface of inner race A and the inner surface of outer race B.

More specifically and with reference to FIGS. 1-3, inner race A is comprised of a generally cylindrical hollow body 10 having opposed ends 12,14. Integrally formed in the outer surface of the body generally centrally between ends 12,14 is an outwardly opening bearing member receiving groove 16 which extends circumferentially around the body. The outermost lateral edges of this groove terminate in circumferentially extending generally V-shaped areas 18,20. Thus, inner race A has a generally W-shaped cross-section. Protruding laterally outward from V-shaped areas 18,20 are flange areas generally designated 22,24, respectively, which extend to ends 12,14. In the preferred embodiment here under discussion, cylindrical body portion 10 is formed from a sheet metal or steel blank in a manner which will be described hereinafter. During the forming operation, the opposed ends 26,28 of the sheet metal blank are brought together in a close spaced relationship so as to define a slot or slot-like area 30 therebetween.

Again with reference to FIGS. 1—3, outer race B is comprised of a cylindrical body designated 40 having opposed ends 42,44. Integrally formed in the inner surface of cylindrical body 40 generally centrally of ends 42,44 so as to extend circumferentially therearound is an inwardly opening bearing member receiving groove 46. Groove 46 terminates at the lateral side edges thereof in circumferentially extending generally V-shaped areas 48,50. Thus, outer race B has a generally W-shaped cross-section. Extending outwardly from the V-shaped areas 48,50 to ends 42,44 are flange areas 52,54, respectively. Cylindrical body 40 is also formed from a sheet metal or steel blank in a manner to be described hereinafter with the ends 56,58 being brought together in a close spaced relationship with each other so as to define a slot or slot-like area 60 therebetween.

The diameters of cylindrical bodies 10,40 are such that receiving grooves 16 and 46 will be spaced apart from each other and define an annular ball or rolling member receiving area therebetween. A plurality of ball or rolling members generally designated 70 are received in and retained between grooves 16,46 in order to faciliate relative rotation between the inner and outer races. In the preferred arrangement of the present invention, members 70 comprise steel balls closely spaced to each other around the entire receiving area defined between the races.

With the formation of bodies 10,14 in the manner hereinabove described so as to include slots 30,60, respectively, the two bodies form what may be termed split races. Accordingly, when inserting ball bearing members 70 between receiving grooves 16,46, ends 26,28 and 56,58 may be forced together or spread apart slightly in order to insert ball bearing members 70 over V-shaped areas 18,20 and 48,50 into the receiving grooves themselves. As will be described hereinafter in greater detail with reference to the description of the method for forming the races, sheet metal or steel bodies 10,40 are squeezed or worked during forming into the plastic range to eliminate any residual spring back or the like which would otherwise be present. As a result, ends 26,28 and 56,58 will not have a tendency to spring back or otherwise deform so as to increase the size of slots 30,60 and thereby adversely affect the overall operation of the bearing structure. Once ball bearing members 70 are properly seated in grooves 16,46, bodies 10,40 may be deformed slightly or closed so that ends 28,30 and 58,60 are in an engaging but unconnected relationship with each other.

With particular reference to FIG. 3, the bearing arrangement of FIGS. 1 and 2 is shown as used in a typical application for a wheel. In this arrangement, there is included an inner housing 80 and an outer housing 82 with inner and outer housings having end defining spoke-like areas 84. These housings may be rigidly interconnected with each other by convenient conventional means and include areas defining spaced apart bearing structure retaining side walls 86,88 and bearing structure retaining inner wall 90. Side walls 86,88 closely embrace ends 42,44 of outer race B and inner wall 90 closely embraces the outer peripheral surface of outer race B. Side walls 86,88 also include openings 92,94, respectively, which permit ends 12,14 of cylindrical body 10 to pass therethrough in order that there may be relative rotation between the inner and outer races. Inner and outer housings 80,82 also cooperate to define an outer roller surface 96. In practical application, cylindrical body 10 may be conveniently affixed to a shaft or mounting member with roller surface 96 engaging the ground, wall or other surface. In FIGS. 2 and 3, inner race A is shown as being longer than outer race B although the relative lengths of them may be varied as necessary and/or desirable. Moreover, the wheel shown in FIG. 3 is merely an example of an application for the roller bearing structure and is not intended to in any way be construed as the only application.

FIG. 4 shows a modification of the bearing of FIGS. 1-3 in which only the outer bearing race is formed from a sheet metal. In this arrangement, there is provided an elongated cylindrical shaft 100 having a portion 102 defining an inner race area and the portion 104 defining a mounting portion adjacent one end of the portion 102. In portion 102, there is provided a pair of spaced apart outwardly opening ball bearing member receiving grooves 106,108. These grooves may be integrally formed or machined into cylindrical shaft 100. Mounting portion 104 includes a serrated area 110 immediately adjacent the interface between portions 102 and 104 and which serrated area tapers inwardly slightly from the interface area to a threaded are a 112. Threaded area 112 extends outwardly from the outermost end of serrated area 110 to the outer end of mounting portion 104. The other end of shaft 100 merely defines a flat end face 114. In the preferred arrangement here under discussion, shaft 100 is a solid member although hollow shafts or other constructions could be advantageously employed if desired without departing from the scope of the invention.

The outer race of this alternative embodiment is comprised of an elongated cylindrical body 120 having opposed ends 122,124 and an intermediate portion 126. Cylindrical body 120 is formed from a sheet metal blank by press working techniques which will be described hereinafter and includes a pair of spaced apart circumferential inwardly opening roller bearing member receiving grooves 128,130. These grooves are spaced apart in a manner so that they will register with grooves 106,108. Disposed along the lateral side edges of each of these grooves are circumferential V-shaped areas 132,134 with areas 132 extending to ends 122,124 and areas 134 connected to intermediate portion 126. Thus, the outer race has the general appearance of a double W-shape in cross-section. Although not shown in FIG. 4, cylindrical body 120 is brought into a close spaced relationship with each other so as to define a slot or slot-like area therebetween. This configuration is substantially identical to the configuration shown and described in detail hereinabove with reference to FIGS. 1-3.

A plurality of ball bearing members 144 are disposed in each of grooves 106,108 of inner race area 102 and grooves 128,130 of cylindrical body 120. Since the spacing between grooves 106,108 and 128,130 is identical, the pairs of grooves 106,128 and 108,130 define a pair of annular shaped bearing member receiving areas. Installation of ball bearing members 144 in grooves 106,128 and 108,130 is facilitated by temporary distortion of cylindrical body 120 at the end areas as hereinabove previously described with reference to the embodiment of FIGS. 1-3.

As partially shown in FIG. 4, a housing generally designated 150 having a closed end wall 152 closely spaced from end face 114 of shaft member 100 and an open ended wall 154 through which mounting portion 104 of shaft 100 may protrude from mounting purposes. An intermediate or spoke area 156 is also included which leads to a circular roller surface (not shown) at the outer end thereof similar to that shown in FIG. 3. Housing 150 also includes flange areas 158,159 which closely embrace a portion of the outer peripheral surface of cylindrical body 120 with end walls 152,154 being closely received over ends 122,124 of cylindrical body 120. With this structure, there may be relative rotation by means of ball bearing members 144 between the inner and outer bearing races. Moreover, the bearing structure itself may be conveniently mounted to a surface or body by means of threaded area 112. Serrations 110 may also act to retain the shaft in a fixed position. Housing arrangement 150 described above is only for purposes of showing a typical arrangement and may be varied as desired or necessary to accommodate specific uses without departing from the scope of the present invention.

If desired, it would be possible to employ the multiple rows of ball bearing members as shown in FIG. 4 with the inner and outer bearing races fabricated from sheet metal or steel as shown and described with reference to FIGS. 1-3.

FIG. 5 shows still another arrangement incorporating the concepts of the present invention wherein the inner race is formed from a sheet metal or steel blank in a manner which will be described hereinafter. The inner race configuration is elongated to provide a mounting area or shaft for the overall bearing structure. This particular arrangement is deemed particularly advantageous for use with overhead doors and the like such as garage doors.

Specifically, the inner race is comprised of an elongated hollow cylindrical body designated 160 having opposed ends 161,162. Integrally formed in the outer surface of the body adjacent end 161 is an outwardly opening bearing member receiving groove 163 which extends circumferentially around the body. A stop collar 164 may also be integrally formed with body 160 adjacent receiving groove 163 toward end 162 to extend outwardly from the body outer surface. This collar is of value in locating and retaining the bearing structure in a precise desired installed or operable position. Although, for some specific installations it may be desirable to eliminate the stop collar.

During the forming of body 160, the opposed ends 165, 166 of the sheet metal blank are brought together in a close spaced relationship so as to define a slot or slot-like area 167 therebetween. In the FIG. 5 arrangement, the sheet metal blank from which body 160 is formed has a greater width dimension between ends 161,162 than length dimension between ends 165,166. Also and during forming of body 160, a small, generally elliptical, opening may be formed at stop collar 164 between ends 165,166. This opening is inherent in body 160 because of the nature of formation and while such an opening is permissible without affecting bearing operation, it is deemed desirable to keep the opening as small as practical.

Finally, a wheel assembly 168 which defines an outer race and includes an inwardly opening bearing member receiving groove therein is operably mounted on body 160 at receiving groove 163 by means of a plurality of ball bearing members 169. This mounting is similar in manner to that discussed in detail hereinabove. Here, however, installation of ball bearing members 169 in the bearing member receiving grooves is facilitated by temporary distortion of elongated cylindrical body 160 at end areas 165,166.

With particular reference to FIGS. 6–12, description will hereinafter be made to the method of manufacture of a sheet metal bearing race as structurally described above. For purposes of explanation, the method will be described with reference to the outer bearing race B shown in FIGS. 6 and 7. Bearing race B as shown in these FIGURES is identical to the one shown and described with reference to FIGS. 1–3. It will be appreciated, however, that the other sheet metal races shown and described hereinabove with reference to all of FIGS. 1–5 may also be manufactured by the same method.

FIGS. 8–12 schematically show the apparatus and method for forming the outer race wherein a single progressive type die is employed. This die has upper and lower die halves or shoes which are readily mountable by conventional means to the ram and bed of a conventional press employed for metal working and forming operations. In FIGS. 8 and 9, there is shown an upper die shoe 170 and a lower die shoe 172. In a typical installation, lower die shoe would be mounted to the press bed (not shown) and the upper die shoe would be mounted to the press ram (not shown) by conventional means such as die or tie bolts (not shown). In view of the fact that the press itself does not form any part of the present invention and its operation and the mounting of the die thereto will be known to those skilled in the art, a further description or showing thereof is not made herein.

In practicing the method, a continuous or indeterminate length of sheet metal or steel strip stock 174 is fed between die shoes 170,172. Strip stock 174 may be conveniently moved into and through the die by means of a conventional shuttle arrangement schematically shown and generally designated 176 in the FIGURES. Such shuttle constructions are shown in the art and may take many different forms. However, since the shuttle does not form a part of the present invention, it is only shown schematically and not described in greater detail herein. The width of strip stock 174 is the precise width required for the final shape and configuration of outer race B. Thus, no trimming or other final width dimensioning metal removal steps are required during the forming of the race.

In the first work station generally designated K, a slit or slot 178 is cut into strip stock 174 during a press stroke by conventional cooperating upper and lower male and female punch assemblies 180,182. Slit or slot 178 extends transversely across strip stock 174 over substantially the entire width thereof but sufficiently short of the full width by a mount suitable to prevent actual separation of the material. Thus, small land areas are disposed between the ends of slit or slot 178 and the outermost side edges of the strip stock.

Form work station K and between consecutive press strokes, stock is advanced in direction a by shuttle 176 into work station L by an amount exactly equal to the required length required to make the final race configuration plus the width of the slot being cut. The next press stroke again brings die shoes 170 and 172 into close proximity to each other in order that male and female punch assemblies 180,182 will punch another slot 178 into the strip stock a precisely spaced distance from the first slot 178. Between press strokes, shuttle 176 advances strip stock 174 into the next work station M.

In work station M, a longitudinal groove 184 is formed generally centrally of strip stock 174 between consecutive slots 178. This groove will, in the final race configuration, comprise ball or rolling bearing member receiving groove 46 and is initially formed by a simple forming arrangement comprised of cooperating male 186 and female 188 forming components. In the manufacture of the outer race B here under discussion, groove 184 is formed on the bottom side of strip stock 174. However, it is possible to reverse the positions of components 186,188 in order that the groove could be formed on the top side of the strip stock when inner races are being formed.

As the press stroke continues after forming of longitudinal groove 184, shuttle 176 moves the entire strip to the next work station generally designated N. This work station essentially comprises an idle station where no actual work is performed on the strip during the subsequent press stroke.

Following that press stroke, shuttle 176 moves the strip stock to work station O where slot 178 is aligned with cutter 190 and cooperating cutter edge 192. On the next press stroke, die components 190,192 are brought in operative communication so that the slot is extended in a manner to sever that section of the strip stock located at work station O from the remainder of strip stock 174. The separate or severed piece of strip stock at work station O then comprises a bearing race blank and is generally designated by numeral 194.

During the next press stroke, a shuttle arrangement generally designated 196 which may be of conventional construction and be of several alternative designs moves blank 194 from work station O in the direction of arrow b into work station P. The directions of feed directions a and b are transverse or 90° disposed from each other. Work station P itself is shown in FIG. 8 and more particularly schematically shown in FIG. 10. In this work station, blank 194 is located by shuttle 196 on a pedestal arrangement 200 between forming members 202,204 and 206. Forming member 202 is mounted for reciprocal movement to upper die shoe 170 and forming members 204,206 are mounted for reciprocal sliding movement to lower die shoe 172. The directions of reciprocal movement of these three forming members are shown by the arrows adjacent each member 202,204 and 206 in FIG. 10. Forced movement of forming members 204,206 may be conveniently effected by known means through cooperation between the upper and lower die shoes. In work station P, the ends of blank 194 are curled, primarily through contact with forming means 204,206 about pedestal 200. The curled end portions of blank 194 are made to accurately conform to the radius desired in the finished diameter of the ball race itself.

As the press stroke continues so that die shoes 170,172 are again moved apart from each other, the partially curled blank 194 is moved by a shuttle arrangement schematically shown and generally designated 208 from work station P to work station Q. This work station is generally shown as FIG. 8 and more particularly schematically shown in FIG. 11. Shuttle 208 moves partially curled blank 194 to and locates it on arbor arrangement generally designated 210. Forming members 212,214 and 216 are employed to bring blank 194 into a final configuration. Forming member 212 may be conveniently mounted to upper die shoe 170 and forming members 214,216 may be conveniently mounted to lower die shoe 172 for reciprocation between forming positions closely spaced and in contact with blank 194 and non-forming positions spaced apart from each other and from arbor 210. The directions of movement of these members are shown by the arrows disposed adjacent thereto. Forming members 214,216 may also be conveniently mechanically connected or operated by movement of upper shoe 170 as is known in the die making art. Arbor 210 and forming members 212,214 and 216 also include cooperating male and female forming areas thereon for final forming of longitudinal grooves 184 initially formed in work station M. Thus, during the press stroke when die shoes 170,172 are brought into close communication with each other and with arbor and forming members in a forming relationship with blank 194, longitudinal groove 184 will be brought to its final desired configuration defining an inwardly opening roller member receiving groove 146 having V-shaped areas 48,50 adjacent the lateral edges thereof.

Moreover, opposite ends 56,58 (FIG. 6) of the blank are brought into a close spaced relationship with each other to define slot or slot-like area 60. The partial radius or curl of the opposite ends of blank 194 formed in work station P as hereinabove described, must be sufficiently accurate so that the radius of forming members 212,214 and 216 in work station Q will properly engage the partially formed blank and control it before the actual forming action of the forming members begins. Following forming in work station Q and on the upward stroke of the press, blank 194 which is now in substantially a final form as comprising a bearing race B is conveniently stripped from arbor 210 and moved by conventional shuttle means schematically shown and designated by numeral 218 to the final work station R. Removal of the ball race from arbor 210 into shuttle 218 may be by any convenient means such as a stripper plate which operates in conjunction with shuttle 218 in a manner deemed known in the die making art.

Work station R is generally shown in FIG. 8 and more specifically schematically shown in FIG. 12. This work station comprises a restrike or sizing station where the ball race is given its final dimensions. More particularly, a pair of sizing or restriking jaws 220,222 are conveniently mounted for reciprocal movement on lower die shoe in the direction of the arrows shown adjacent thereto. These jaws include accurately dimensioned restrike zones or halves which completely surround cylindrical body 40. These jaws are initially spaced from each other so as to allow placement of cylindrical body 40 therebetween as it is moved from work station Q by shuttle 218. Conventional stops or locating blocks may be employed for automatically locating the cylindrical body between jaws 220,222. Spring biasing means generally designated 224 are operably disposed between the jaws to continuously urge them apart from each other. The jaws may be forcibly moved to a squeezing position closely surrounding and in engagement with body 40 by a cam action arrangement associated with downward movement of upper die shoe 170 or other convenient known means.

The dimensioning of the areas of jaws 220,222 which actually engage cylindrical body 40 are such that they impart a squeezing or working force to the entire outer surface of cylindrical body 40. This squeezing or working force has the effect of upsetting the crystalline structure of the sheet metal race and placing the material in the plastic range to thereby overcome any spring back tendencies. Spring back is an otherwise inherent physical characteristic found in formed sheet metal parts and which characteristics would otherwise cause an undesirable size or dimensional change in the part. In the subject bearing race, the spring back tendencies would be found at ends 56,58 and manifest itself as a spreading apart of these ends to increase the width slot or slot-like area 60. Such a situation would cause unacceptable operational results for the race as a bearing incorporating such a race would not operate smoothly because of contact between ball bearing members 70 and slot 60. Therefore, prior art bearing races for semi-precision ball or rolling bearings which have been formed from sheet metal have necessarily included the additional manufacturing step of positively joining the ends thereof which correspond to ends 56,58 of the subject invention together. This necessity requires an additional step which adds additional costs to the end product. On the upward stroke of the press and as jaws 220,222 return to their spaced apart position, the completed outer race B comprised of cylindrical body 40 is ejected from work station R. This ejection may be by any convenient means such as air blow-offs, positive knock-outs or like devices known in the art.

In the method hereinabove described with reference to FIGS. 6–12, eight work stations are utilized for forming the split ring outer race B specifically shown in detail in FIGS. 6–7. While eight work stations are shown for completion of a single outer race, it will be appreciated that the forming of races is a continuous process. That is, a partially completed race is located in each of work stations K–R. Thus, while it takes eight consecutive press strokes to form a single race B from strip stock 174 as it enters work station K, one completed race will be ejected from work station R with each press stroke since the manufacturing process is continuous. Use of the above described method facilitates the manufacture of bearing races which may be held to very close tolerances, that is, plus or minus 0.001 inch on critical roller bearing member receiving groove radii and diameters.

The upper and lower die shoes 170,172 themselves along with the various components thereof as described above are generally known to those skilled in the art. Several different and alternative means may be employed for the various punching, cutting and forming members 180,172; 186,188; 190,192; 202,204,206; 212,214,216; and, 220,222 in FIGS. 8–12 as well as for operation thereof. In FIGS. 10 and 11, forming members 202,212 are disclosed as being affixed directly to upper die shoe 170 and forming members 204,206; 214,216; and, 220,222 are each shown as having a cam surface 228 thereon which is engagable by cam means mounted directly to upper shoes 170 in a manner known in the art. In this type of structure, pneumatic power cylinders or die springs may be conveniently utilized to continuously urge these members to their spaced apart relationship from each other when the press is at the top of its stroke with die shoes 170,172 spaced apart from each other. Likewise, positive drive and return means interconnected between upper die shoe 172 and the forming members could also be advantageously employed. In view of the fact that the specifics of the structure involved do not form a part of the present invention, they are not shown or described in greater detail herein.

In the final configuration of outer race B which is comprised of cylindrical body 40 as shown in FIGS. 6 and 7, opposed ends 56,58 of blank 194 are brought into close communication with each other so as to form slot or slot-like area 60. Depending upon the size of the race area itself, the size of the slot may vary. However, and merely by way of example, a 1/32 or 1/16 inch may be provided for an outer race having an approximately 1 inch or less outer diameter.

During assembly of bearings of the types shown in FIGS. 1–5, the fact that the ends of the formed sheet metal races are not connected to each other and the further fact that they are movable relative to each other facilitates ease of bearing assembly not heretofore attainable with prior bearings of this general type. That is, the ends may be forced slightly together or apart in order that the ball bearing members may be received in the bearing member receiving grooves. Following assembly, the ends of these split ring type races are forced toward engagement with each other to eliminate the initial spacing therebetween for allowing smooth bearing operation. Thus, the original slots are transformed in slits. In view of the fact that the final sizing, squeezing and working step of the manufacturing process is such to place the sheet metal race in the plastic range, such closing may be easily effected without concern as to any spring back. Again, elimination of the spring back characteristics in the ball race eliminates the necessity for joining the ends together as has heretofore been the case with prior sheet metal races. Also and as previously noted, the method described with reference to FIGS. 8–12 is equally applicable to both inner and outer races, elongated races and races having a plurality of bearing receiving grooves such as all of those shown and described with reference to FIGS. 1–5.

The description above could also be applied to roller bearings. Moreover, and although the ball bearing structures and method have been particularly described with reference to the preferred construction from sheet metal or steel, it is possible to utilize other fairly rigid metals or materials which are formable and which may be worked into a plastic range. Use of such alternative materials, however, does not depart from the intent or scope of the present invention.

The invention has been described with reference to the preferred embodiment. Obviously, modifications and alterations will occur to others upon the reading and understanding of the specification. It is my intention to include all such modifications and alterations insofar as they come within the scope of the appended claims or the equivalents thereof.

Having thus described my invention, I now claim:

1. A bearing comprising in combination:
    an inner race formed from a strip of sheet metal having spaced apart ends and formed through the plastic range into a first cylindrical configuration with said inner race ends closely spaced to each other and defining a first slot which allows said inner race ends to be selectively moved toward and away from each other, said inner race including at least one integrally formed outwardly opening roller member receiving groove circumferentially disposed in the outer peripheral surface thereof;
    an outer race formed from a strip of sheet metal having spaced apart ends and formed through the plastic range into a second cylindrical configuration having a diameter greater than said inner race with said outer race ends closely spaced relative to each other and defining a second slot which allows said outer race ends to be selectively moved toward and away from each other, said outer race including at least one integrally formed inwardly opening rolling member receiving groove circumferentially disposed in the inner peripheral surface thereof; and,
    a plurality of rolling members disposed between said inner and outer races and closely received in said outwardly and inwardly opening grooves for allowing relative rotation between said races, said first and second slots allowing forced insertion of said rolling members between said races and into said grooves.

2. The bearing as defined in claim 1 wherein each of said at least one outwardly and inwardly opening grooves includes outwardly extending flange areas adjacent the lateral side edges thereof.

3. The bearing as defined in claim 2 wherein said inner race includes one outwardly opening rolling member receiving groove and said outer race includes one inwardly opening rolling member receiving groove with both of said inner and outer races having generally W-shaped cross sections.

4. The bearing as defined in claim 3 wherein said rolling members comprise balls.

5. The bearing as defined in claim 1 wherein said inner race includes a pair of spaced apart outwardly opening rolling member receiving grooves and said outer race includes a pair of spaced apart inwardly opening rolling member grooves, the grooves of said inner and outer races adapted to register with each other.

6. The bearing as defined in claim 5 wherein said each of said inner and outer races has a generally W-shaped cross section at said grooves and a transition zone disposed between said grooves.

7. The bearing as defined in claim 6 wherein said rolling members comprise balls.

8. A bearing comprising in combination:
    a cylindrical inner race having at least one outwardly opening rolling member receiving groove circumferentially disposed in the outer peripheral surface thereof; a cylindrical race having at least one inwardly opening rolling member receiving groove circumferentially disposed in the inner peripheral surface thereof with said outer race having a diameter larger than the diameter of said inner race; at least one of said inner and outer races being formed from a strip of sheet metal having spaced apart ends and formed through the plastic range into a cylindrical configuration with said ends closely spaced relative to each other and defining a first slot which allows said ends to be selectively moved toward and away from each other, said at least one race having the associated rolling member receiving groove integrally formed therein; and, a plurality of rolling members disposed between said inner and outer races and closely received in said outwardly and inwardly opening grooves for allowing relative rotation between said races, said first slot allowing forced insertion of said rolling members between said races and into said grooves.

9. The bearing as defined in claim 8 wherein said at least one race includes outwardly extending flange areas adjacent the lateral side edges of the rolling member receiving groove integrally formed therein, said at least one race having a generally W-shaped cross-section at said groove.

10. The bearing as defined in claim 9 wherein said inner and outer races each includes a pair of rolling member receiving grooves with said grooves of said inner and outer races adapted to register with each other, said at least one race having a generally W-shaped cross section at said grooves and a transition zone disposed therebetween.

11. The bearing as defined in claim 9 wherein said rolling members comprise balls.

12. The bearing as defined in claim 11 wherein said at least one race comprises said inner race.

13. The bearing as defined in claim 9 wherein said inner race is comprised of an elongated shaft having said at least one outwardly opening rolling member receiving groove formed therein with said outer race comprising said at least one race.

14. The bearing as defined in claim 13 wherein said shaft includes means adjacent at least one end thereof for affixing said rolling bearing to a body.

15. The bearing as defined in claim 8 wherein said inner race includes a pair of outwardly opening rolling member receiving grooves spaced apart from each other and said outer race includes a pair of inwardly opening roller member receiving grooves spaced apart for registry with the receiving grooves of said inner race.

16. The bearing as defined in claim 8 wherein said inner and outer races are both formed from strips of fairly rigid formable material.

17. The bearing as defined in claim 16 wherein said at least one outwardly and inwardly opening rolling member receiving grooves each includes outwardly extending flange areas adjacent the lateral side edges thereof.

18. The bearing as defined in claim 17 wherein said inner and outer races have generally W-shaped cross sections at said receiving grooves.

19. The bearing member as defined in claim 16 wherein said inner and outer races each includes a pair of rolling member grooves with said grooves of said inner and outer races adapted to register with each other, said races each having a generally W-shaped cross section at said grooves with a transition zone disposed therebetween.

20. The bearing as defined in claim 19 wherein said inner and outer races further include outwardly extending flange areas between said receiving grooves and the adjacent inner and outer race side edges.

21. The bearing as defined in claim 8 wherein said at least one race comprises said inner race, said inner race being elongated and having at least one outwardly opening rolling member receiving groove formed adjacent one end thereof with the other end adapted to operably mount said bearing.

22. The bearing as defined in claim 21 wherein said inner race further includes an outwardly extending collar between said at least one rolling member receiving groove and said other end and circumferentially disposed to extend outwardly from the outer peripheral surface thereof.

23. The bearing as defined in claim 22 wherein said collar is integrally formed in said inner race.

* * * * *